United States Patent
Pflanzer et al.

(10) Patent No.: US 9,485,906 B2
(45) Date of Patent: Nov. 8, 2016

(54) TURF-CARE VEHICLE OPERATOR PRESENCE DETECTION

(71) Applicant: Textron, Inc., Providence, RI (US)

(72) Inventors: Ross Allen Pflanzer, Greenwood, IN (US); Matthew Dewane Jackson, Brownsburg, IN (US); Joseph Lowell Harper, Waxhaw, NC (US)

(73) Assignee: Textron Inc., Providence, RI (US)

( * ) Notice: Subject to any disclaimer, the term of this patent is extended or adjusted under 35 U.S.C. 154(b) by 0 days.

(21) Appl. No.: 14/642,835

(22) Filed: Mar. 10, 2015

(65) Prior Publication Data

US 2016/0262305 A1 Sep. 15, 2016

(51) Int. Cl.
*A01D 34/00* (2006.01)
*F16P 3/00* (2006.01)
*A01B 45/00* (2006.01)
*A01D 101/00* (2006.01)

(52) U.S. Cl.
CPC .............. *A01D 34/006* (2013.01); *A01B 45/00* (2013.01); *F16P 3/00* (2013.01); *A01D 2101/00* (2013.01)

(58) Field of Classification Search
CPC ....... A01D 34/006; A01D 75/20; F16P 3/00; F16P 3/008; A01B 45/00
USPC ............................... 56/10.2 R, 10.5; 280/32.5
See application file for complete search history.

(56) References Cited

U.S. PATENT DOCUMENTS

| | | | | |
|---|---|---|---|---|
| 4,323,136 A | * | 4/1982 | van der Lely | A01B 71/08 172/112 |
| 6,301,864 B1 | * | 10/2001 | Damie | A01D 34/6812 56/11.3 |
| 6,782,964 B1 | * | 8/2004 | Korthals | B62D 51/02 180/273 |
| 6,941,737 B2 | * | 9/2005 | Kempf | A01D 75/20 56/10.2 R |
| 7,126,237 B2 | * | 10/2006 | Walters | A01D 34/828 307/9.1 |
| 8,141,886 B1 | * | 3/2012 | Sugden | A01D 34/82 280/291 |
| 8,924,039 B2 | * | 12/2014 | Miller, IV | B66F 9/075 180/78 |
| 9,220,194 B2 | * | 12/2015 | Ulmefors | A01D 34/662 |
| 9,261,234 B2 | * | 2/2016 | DiLuciano | B60L 3/0092 |

* cited by examiner

*Primary Examiner* — John G Weiss
(74) *Attorney, Agent, or Firm* — Polster Lieder

(57) ABSTRACT

An operator detection system for sensing the presence of an operator at an operator control station of a turf-care vehicle is provided. The system comprises at least one operator presence sensor structured and operable to sense whether an operator is present at the operator control station and a controller communicatively connected to the operator presence sensor(s). The controller structured and operable to determine whether each of the operator presence sensor(s) sense(s) that an operator is present at the operator control station, enable operation of an engine of the vehicle and at least one cutting unit of the vehicle when one or more operator presence sensor(s) sense(s) that the operator is present at the operator control station, and disable operation of the engine and at least one cutting unit when one or more operator presence sensor(s) sense(s) that the operator is not present at the operator control station.

19 Claims, 3 Drawing Sheets

TURF-CARE VEHICLE OPERATOR PRESENCE DETECTION

FIELD

The present teachings relate to turf-care vehicles, and more particularly to operator presence detection for turf-care vehicles.

BACKGROUND

The statements in this section merely provide background information related to the present disclosure and may not constitute prior art.

Turf-care vehicles, such as seated riding turf-care vehicles, stand-on riding turf-care vehicles and walk-behind turf-care vehicles generally include one or more grass cutting units for cutting grass, e.g., one or more cylindrical reel assemblies, or one or more rotatory blade grass cutting decks. For various reasons, it is important to ensure that operation of the vehicle, and particularly the cutting units, is ceased when the vehicle operator dismounts, disembarks or otherwise becomes separated from the vehicle from an operator control station or location of the vehicle.

Many known turf-care vehicles typically employ a plunger-type operator presence safety switch disposed under the seat of seated riding turf-care vehicles, in the standing platform of stand-on riding turf-care vehicles, or in the steering mechanism of walk-behind and some stand-on turf-care vehicles. Generally, such plunger switches are hard-wired into the main wiring harness of the respective vehicle and must always be activated (i.e., either depressed or undepressed) in order for the vehicle engine (e.g., an internal combustion engine or electric motor of the vehicle) and the cutting units to function in mowing operation. For example, with zero-turn stand-on and walk-behind vehicles, the plunger switch is typically disposed within the steering mechanism. In such instances at least one of the steering handles is spring loaded such that the handle must be constantly maintained by the operator in a depressed state in order for maintain the plunger switch in the activated state, whereby the cutting units are engaged and allowed to operate. Such handle activated plunger switches can be cumbersome, fatiguing and difficult to use for extended periods of times.

SUMMARY

The present disclosure provides an operator detection system for sensing the presence of an operator at an operator control station of a turf-care vehicle. In various embodiments, the system comprises at least one operator presence sensor disposed adjacent the operator control station of the vehicle, and a controller communicatively connected to the operator presence sensor(s). The operator presence sensor(s) is/are structured and operable to sense whether an operator is present at the operator control station. Generally, the controller is structured and operable to communicate with the operator presence sensor(s) and determine whether each operator presence sensor senses that an operator is present at the operator control station. The controller is additionally structured and operable to enable operation of an engine of the vehicle and at least one cutting unit of the vehicle when at least one of the operator presence sensor(s) sense(s) that the operator is present at the operator control station. The controller is further structured and operable to disable operation of at least one of the engine and at least one cutting unit when at least one of the operator presence sensor(s) sense(s) that the operator is not present at the operator control station.

Further areas of applicability of the present teachings will become apparent from the description provided herein. It should be understood that the description and specific examples are intended for purposes of illustration only and are not intended to limit the scope of the present teachings.

DRAWINGS

The drawings described herein are for illustration purposes only and are not intended to limit the scope of the present teachings in any way.

Corresponding reference numerals indicate corresponding parts throughout the several views of drawings.

DETAILED DESCRIPTION

Figure 1:
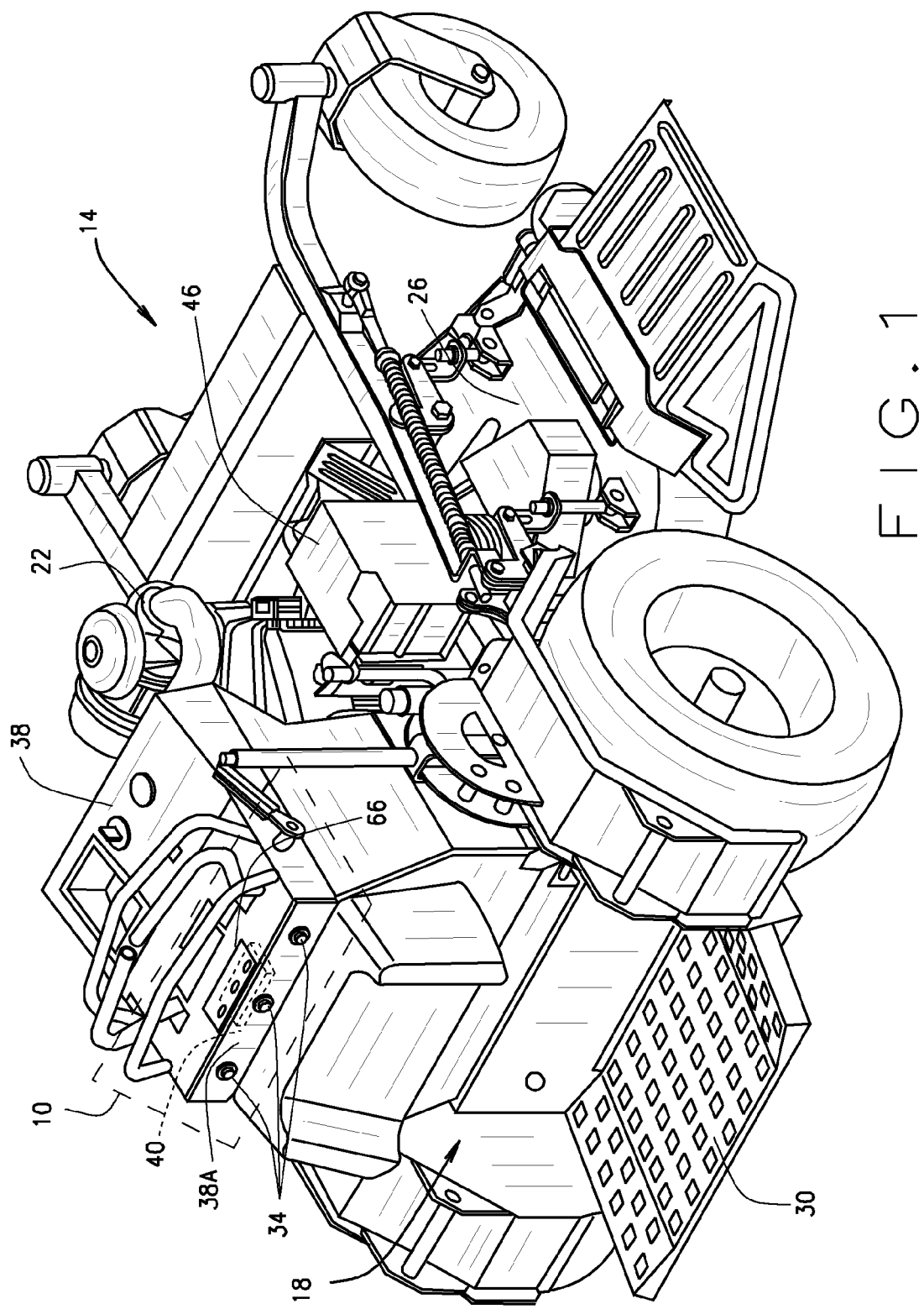
FIG. 1 is an isometric view of a turf-care vehicle including an operator detection system, in accordance with various embodiments of the present disclosure.

The following description is merely exemplary in nature and is in no way intended to limit the present teachings, application, or uses. Throughout this specification, like reference numerals will be used to refer to like elements.

Unless otherwise defined, all technical and scientific terms used herein have the same meaning as commonly understood by one of ordinary skill in the art to which this disclosure belongs. Any use of a singular term, such as the number one (1), is intended to encompass numerical values greater than one, such as represented by the phrase "one or more." Any use of inclusive terms such as "including" or "such as" and the like is intended to be open ended, with a meaning similar to "including, but not limited to." All publications, patent applications, patents, and other references mentioned herein are incorporated by reference in their entirety.

Referring to FIG. 1, the present disclosure provides an operator detection system 10 that can be included as part of a turf-care vehicle 14, such as any turf-care vehicle typically used for cutting, grooming and maintaining grass at golf courses, sporting venues, parks, commercial properties, residential properties, etc. The turf-care vehicle 14 can be any seated riding turf-care vehicle, stand-on riding turf-care vehicle or walk-behind turf-care vehicle. For simplicity, the turf-care vehicle 14 will be exemplarily illustrated and described herein as a stand-on riding turf-care vehicle, but it will be appreciated that the scope of the present disclosure should not be so limited. The turf-care vehicle 14 additionally includes an operation control station 18 where an operator positions himself/herself to control operation of the vehicle 14, an engine 22 (e.g., an internal combustion engine or one or more electric motors) structured and operable to provide motive power/force to propel to the vehicle 14 across a ground surface, and one or more grass cutting units 26 (e.g., rotary deck(s) and/or reel assembly(ies)) structured and operable to cut grass traversed by the vehicle 14.

As described below, the operator detection system 10 is structured and operable to detect (e.g., sense, determine and/or monitor) whether an operator is present at, or within, the operator control station 18 of the vehicle 14, and to disable operation of the grass cutting unit(s) 26 and/or the engine 22 when the operator detection system 10 detects that an operator is not present at, or within, the operator control station 18. As used herein, the operator control station 18 is the location or area where an operator sits, stands, or walks on or adjacent (e.g., behind) the vehicle 14 to control operations of the vehicle 14. Such vehicle operations can include, but are not limited to: operation (e.g., starting/stopping/speed control) of the engine 22 of the vehicle 14; motion control (e.g., steering/speed/forward movement/reverse movement) of the vehicle 14; and operation (e.g., engagement/disengagement) of the grass cutting unit(s) 26. Examples of the operation control station 18 can include, but are not limited to, the seating area or cabin area of a seated riding turf-care vehicle, the area above an operator standing platform of a stand-on riding turf-care vehicle (e.g., operator standing platform 30 of turf-care vehicle 14), and the area immediately behind a walk-behind turf-care vehicle where an operator positions himself/herself to control operation of the vehicle.

Figure 2:
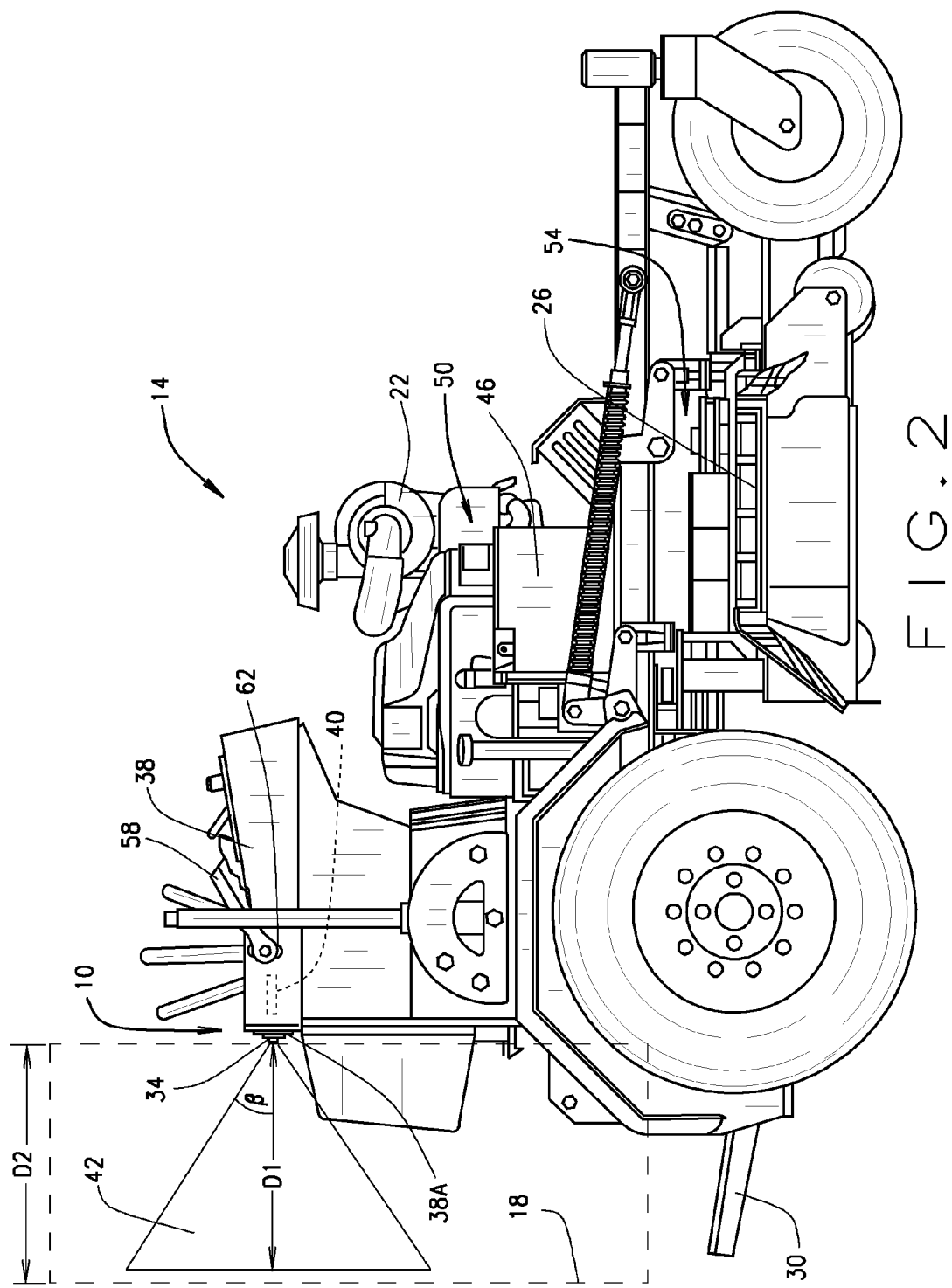
FIG. 2 is a side view of the turf-care vehicle shown in FIG. 1 including the operator detection system and illustrating an example sensing field generated by one or more operator presence sensors of operator detection system, in accordance with various embodiments of the present disclosure.
Figure 3:
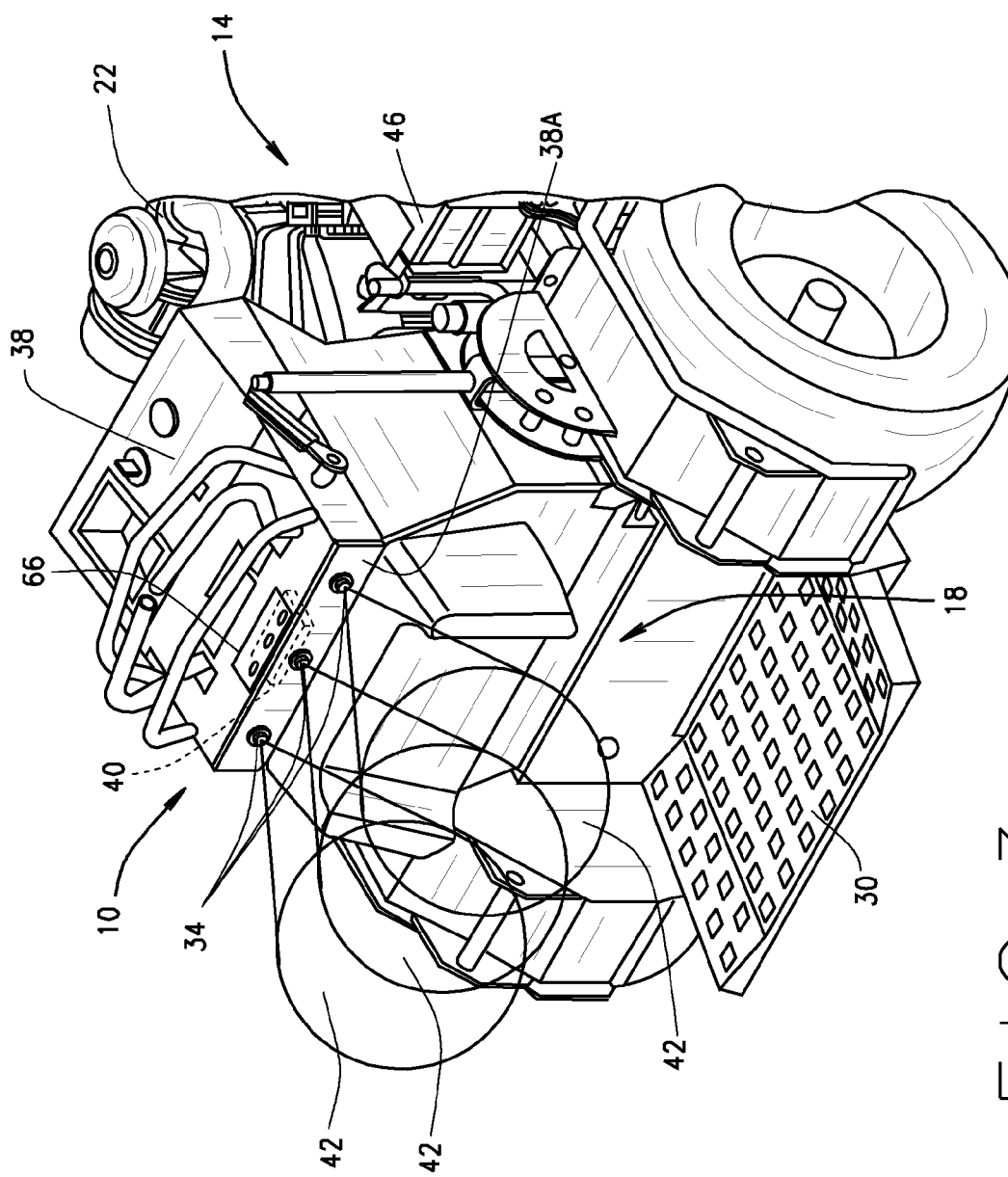
FIG. 3 is an isometric view of a rear portion of the turf-care vehicle shown in FIG. 1 including the operator detection system and illustrating example sensing fields generated by a plurality of operator presence sensors of operator detection system, in accordance with various embodiments of the present disclosure.

Referring now to FIGS. 1, 2 and 3, in various embodiments, the operation detection system 10 generally includes one or more operator presence sensors 34 disposed adjacent the operator control station 18, and a controller 40 communicatively connected to the operator presence sensor(s) 34 (via wired or wireless connection(s)). The controller 40 can be any programmable computer based device or integrated circuit or combination thereof that is structured and operable (i.e., programmable) to implement, monitor and control the operation and functionality of the operator detection system 10 as described herein. For example, in various embodiments, the controller 40 can be a small computer based device having a processor and memory (e.g., a non-transitory memory) for storing software instructions executable by the processor, a microcontroller, an application specific integrated circuit (ASIC), a field programmable gate array (FPGA), or any other suitable programmable integrated circuit.

The operator presence sensor(s) 34 can be disposed anywhere on the vehicle 14 adjacent the operator control station 18 such that the sensor(s) 34 are operable to detect the presence or absence of an operator at, or within, the operator control stations 18. For example, in some embodiments as illustrated by way of example in the figures, the operator presence sensor(s) 34 is/are disposed in a front face 38A of a control panel 38 such that each operator presence sensor 34 is pointed away from the front face 38A toward the operator control station 18. Generally, the operator presence sensor(s) 34 is/are structured and operable to generate or emit a sensing field 42 that projects into the area of the operator control station 18, and based on feedback from the sensing field 42, communicate with the controller 40 to indicate whether or not an operator is present at, or within, the operator control station 18.

More specifically, each sensor 34 communicates with and is monitored by the controller 40. In various embodiments, the controller 40 controls the operation of each sensor 34. Each sensor 34 generates or emits a plurality of signals that comprise the respective sensing field 42. If an operator is present at, or within, the operator control station 18, some or all of the signals reflect off the operator back to the respective sensor 34, whereby the respective sensor 34 provides feedback, or a response, to the controller 40 indicating that respective sensor 34 senses that an operator is present. Conversely, if an operator is not present at, or within, the operator control station 18, the signals will not be reflected off the operator back to the respective sensor 34, whereby the respective sensor 34 provides feedback, or a response, to the controller 40 indicating the respective sensor 34 does not sense that an operator is present. Subsequently, based on the number of operator presence sensors 34 included in the operator detection system 10 and on the response provided by each respective sensor 34, if the controller 40 determines that an operator is present at, or within, the operator control station 18, the controller 40 will enable operation of the engine 22 and at least one of the one or more grass cutting units 26. However, if the controller 40 determines that an operator is not present at, or within, the operator control station 18, the controller 40 will disable operation of at least one of the one or more grass cutting units 26 and, in various embodiments (described below), additionally disable the engine 22.

For example, in various embodiments, if one of the operator presence sensor(s) 34 senses that an operator is present at, or within, the operator control station 18 the controller 40 will determine that an operator is present and will enable operation of the engine 22 and at least one cutting unit 26. However, if one of the operator presence sensor(s) 34 senses that an operator is not present at, or within, the operator control station 18 the controller 40 of such embodiments will determine that an operator is not present and will disable operation of at least one cutting unit 26, and in various implementations, disable operation of the engine 22. Or, for example, in various other embodiments, if two or more of the operator presence sensors 34 (e.g., at least two out of a total of three sensors 34) sense that the operator is present at, or within, the operator control station 18 the controller 40 of such embodiments will determine that an operator is present and will enable operation of the engine 22 and at least one cutting unit 26. However, if two or more of the operator presence sensor(s) 34 (e.g., at least two of a total out of three) senses that the operator is not present at, or within, the operator control station 18 the controller 40 of such embodiments will determine that an operator is not present and will disable operation of at least one cutting unit 26, and in various implementations disable operation of the engine 22.

The one or more operator presence sensors 34 can be any sensor, (e.g., any transceiver) suitable for sensing/detecting/indicating whether an operator is present at, or within, the operator control station 18. For example, each of the operator presence sensors 34 can be an ultrasonic sensor, an infrared sensor, an optical sensor, a magnetic sensor, a thermal sensor, etc. that is structured and operable to generate or emit the sensing field 42 that projects into the area of operator control station 18. In various embodiments, wherein the operator detection system 10 includes a plurality of operator presence sensors 34, each operator presence sensor 34 can be the same type of sensor (e.g., all sensors 34 can be ultrasonic sensors, or infrared sensors, etc.) or alternatively one or more of the sensors 34 can be a different type of sensor (e.g., any combination of ultrasonic, infrared, optical, magnetic and thermal sensors).

In various embodiments, each operator presence sensor 34 is structured and operable to project the respective sensing field 42 a selectable predetermined distance or depth D1 (best shown in FIG. 2), referred to herein as sensor depth of field or field depth D1. For example, in some such embodiments each sensor 34 can be programmed (e.g., via the controller 40) or tuned (e.g., via adjustable setting of the respective sensor 34) to have any desired field depth D1 (i.e., any depth D1 that is within the functional capabilities of the respective sensor 34), e.g., 6 inches, 12 inches, 18 inches, 24 inches, 30 inches, etc. For example, in various embodiments, each sensor 34 can be programmed/tuned to have a field depth D1 that is substantially equal to a depth D2 of the operator control station 18 (best shown in FIG. 2), e.g., 12-24 inches. In various embodiments, wherein the operator detection system 10 includes a plurality of operator presence sensors 34, the field depth D1 of each operator presence sensor 34 can be approximately the same distance, or alternatively one or more of the sensors 34 can have different field depth D1 than one or more of the other sensors 34.

Furthermore, each operator presence sensor 34 is structured and operable to project, generate, or emit the respective sensing field 42 having a predetermined 2-dimensional (2D) or 3-dimensional (3D) shape. For example, each operator presence sensor 34 can be structured and operable to project, generate or emit a sensing field 42 having 2D fan shape, a 2D square or rectangular shape, a 3D cylindrical shape, a 3D cone shape, etc. In various embodiments wherein the projected sensing field 42 of one or more sensors 34 has a 2D fan shape or a 3D cone shape, it is envisioned that the respective sensors 34 can project the respective sensing field having a fixed or adjustable/tunable projection angle 13 (best shown in FIG. 2) of between approximately 0° and 90°. Still further, in embodiments wherein the operator detection system 10 includes a plurality of operator presence sensors 34, the sensors 34 can be selected to, or programmed/tuned to, have sensing fields 42 that intersect or overlap each other, or alternatively to project, generate or emit sensing fields 42 that do not intersect or overlap. For example, in various embodiments, as exemplarily illustrated in FIGS. 2 and 3, each operator presence sensor 34 is structured and operable to project, generate or emit intersecting, overlapping 3D cone shaped sensing fields 42. In various embodiments, the desired 2-dimensional or 3-dimensional shape of the sensing field 42 is selected by selecting and utilizing operator presence sensor(s) 34 that are structured and operable to project sensing field 42 having a desired fixed shape. In various other embodiments, at least one of the operator presence sensors 34 can be structured and operable to be programmable (e.g., via the controller 40) or tunable (e.g., via adjustable setting of the respective sensor 34) to project one of a plurality of optional 2-dimensional or 3-dimensional shapes.

As described above, if the controller 40 determines that an operator is present at, or within, the operator control station 18, the controller 40 will enable operation of the engine 22 at least one of the one or more grass cutting units 26. And conversely, if the controller 40 determines that an operator is not present at, or within, the operator control station 18, the controller 40 will disable operation of at least one of the one or more grass cutting units 26 and, in various embodiments (described below), additionally disable the engine 22. In order to enable and disable the engine 22 and the grass cutting unit(s) 26 the controller 40 is communicatively connected (via a wired or wireless connection) to at least one engine operation control device 50 (shown in FIG. 2) that is structured and operable to enable and disable operation of the engine 22. Similarly, in order to enable and disable operation of the grass cutting unit(s) 26, the controller 40 is communicatively connected (via a wired or wireless connection) to at least one cutting unit operation control device 54 that is structured and operable to enable and disable operation of the grass cutting unit(s) 26 of the vehicle 14. Hence, if the controller 40 determines that an operator is present at, or within, the operator control station 18, the controller 40 will communicate with the engine operation control device(s) 50 and the cutting unit control device(s) 54 to enable operation of the engine 22 and cutting unit(s) 26. Conversely, if the controller 40 determines that an operator is not present at, or within, the operator control station 18, the controller 40 will communicate with the engine operation control device(s) 50 and the cutting unit control device(s) 54 to disable operation of the grass cutting unit(s) 26 and, in various embodiments, the engine 22.

The engine operation control device(s) 50 can be any device(s) suitable for enabling and disabling operation of the engine 22. For example, in various embodiments, wherein the engine 22 comprises an internal combustion engine (ICE), the engine operation control device(s) 50 can comprise one or more ignition coils. More specifically, in such embodiments, the vehicle 14 can include an electronic ignition system (as is well known) that includes the ignition coil(s) and an engine control unit (ECU) (not shown) that controls a flow and distribution of electrical current, via a wiring harness (not shown) of the vehicle 14, from one or more batteries 46 of the vehicle 14 to the ignition coil(s) to controllably provide ignition/combustion to the engine 22. Additionally, in such embodiments, the controller 40 can be electrically connected to the wiring harness and is further structured and operable to control the flow of electrical current from the battery(ies) 46 to ECU and/or the ignition coil(s) (i.e., the engine operation control device(s) 50). Accordingly, when the controller 40 of such embodiments determines that an operator is present at, or within, the operator control station 18, the controller 40 allows current to flow from the battery(ies) 46 to the ECU and/or ignition coil(s), thereby allowing operation of the engine 22. Conversely, when the controller 40 of such embodiments determines that an operator is not present at, or within, the operator control station 18, the controller 40 prevents the current from flowing from the battery(ies) 46 to the ECU and/or ignition coil(s), thereby preventing or stopping operation of the engine 22.

Therefore, if an operator is at, or within, the operator control station 18 while operating the vehicle 14, then steps away from, or out of, the operator control station 18, in response to the feedback/response from the operator presence sensor(s) 34 indicating that the operator is no longer present, the controller 40 of such embodiments will interrupt the flow of electrical current from the battery(ies) 46 to the ECU and/or ignition coil(s), thereby preventing/stopping operation of the engine 22. Subsequently, if the operator positions himself/herself at, or within, the operator control station 18, the controller 40, in response to the feedback/response from the operator presence sensor(s) 34 indicating that the operator is present, the controller 40 will allow the flow of electrical current from the battery(ies) 46 to the ECU and/or ignition coil(s), thereby allowing the operator to restart the engine 22, e.g., via operation of a vehicle starting switch, button or key.

Similarly, the cutting unit operation control device(s) 54 can be any device(s) suitable for enabling and disabling operation of the grass cutting unit(s) 26 of the vehicle 14. For example, in various embodiments, the vehicle 14 can include one or more clutch (e.g., electric clutch(es)) that are operatively connected to the engine(s) 22, e.g., via belt and pulley assembly, to transfer power or torque from the engine(s) 22 to each of the grass cutting units 22 that is utilized to turn or rotate a plurality of grass cutting blades (not shown) of each grass cutting unit 22. That is, when the clutch(es) is/are engaged, power/torque is transferred from the engines(s) 22 to the grass cutting unit(s) 22, whereby the respective grass cutting blades are turned or rotated. Conversely, when the clutch(es) is/are disengaged power/torque is not transferred from the engines(s) 22 to the grass cutting unit(s) 22 and the respective grass cutting blades are not able to be turned or rotated by the engine(s) 22. Additionally, in such embodiments, the controller 40 can be operably connected to the clutch(es) and structured and operable to control engagement and disengagement of the clutch(es) and thereby control operation of the cutting unit(s) 26 in response to the determination by the controller 40 that an operator is, or is not, present at, or within, the operator control station 18. For example, in various implementations wherein the clutch(es) is/are electrically actuated clutch(es), the controller 40 can be electrically connected to the clutch(es) via the wiring harness and structured and operable to control the flow of electrical current from the battery(ies) 46 to the clutch(es) (i.e., the cutting unit operation control device(s) 54). Accordingly, when the controller 40 determines that an operator is present at, or within, the operator control station 18, the controller 40 of such embodiments allows current to flow from the battery(ies) 46 to the clutch(es), thereby allowing engagement of the clutch(es) to transfer power/torque from the engine 22 to the blades of the cutting unit(s) 26, and hence enabling operation of the cutting unit(s) 26. Conversely, when the controller 40 determines that an operator is not present at, or within, the operator control station 18, the controller 40 of such embodiments prevents the current from flowing from the battery(ies) 46 to the clutch(es), thereby preventing or stopping enablement of the clutch(es) for transferring power/torque from the engine 22 to blades of the cutting unit(s) 26, and hence disabling operation of the cutting unit(s) 26.

Therefore, if an operator is at, or within, the operator control station 18 while operating the vehicle 14, then steps away from, or out of, the operator control station 18, in response to the feedback/response from the operator presence sensor(s) 34 indicating that the operator is no longer present, the controller 40 of such embodiments will interrupt the flow of electrical current from the battery(ies) 46 to the clutch(es), thereby preventing/stopping operation of the cutting unit(s) 26. Subsequently, if the operator positions himself/herself at, or within, the operator control station 18, the controller 40, in response to the feedback/response from the operator presence sensor(s) 34 indicating that the operator is present, will allow the flow of electrical current from the battery(ies) 46 to the cutting unit(s) 26, thereby allowing the operator to reengage operation of the cutting unit(s) 25, e.g., via operation of an power take off switch.

It is noted that in various embodiments, wherein the cutting unit control device(s) 54 is/are one or more clutch that is/are operatively connected the engine(s) 22, when the controller 40 disables operation of the engine(s) 22 when it is determined that an operator is not present at, or within, the operator control station 18 (as described above), operation of the cutting unit(s) 26 will effectively simultaneously be disabled. Hence, in such embodiments, the controller 40 can structured and operable to only disable operation of the engine(s) 22 when it is determined that an operator is not present at, or within, the operator control station 18.

In various embodiments, (best shown in FIG. 2) the vehicle 14 additionally includes a parking brake actuator 58 (e.g., a hand actuated lever or a foot actuated pedal) that is controllable by the operator and is structured and operable to set one or more wheel brakes of the vehicle 14 (not shown). As will be readily understood by one skilled in the art without detailed description, the parking brake actuator 58 is movable by the operator between an unlocked/disengaged position and a locked/engaged position. Particularly, the operator can move the parking brake actuator 58 from the unlocked/disengaged position to a locked/engaged position to fixedly engage the one or more wheel brakes (referred to as setting the parking brake), whereby the vehicle 14 will not roll forward or backward until the operator releases the brake(s) by moving the brake actuator 58 to the unlocked/disengaged position. In such embodiments, the vehicle 14 further includes a parking brake sensor 62 that is communicatively connected to the controller 40 (via a wired or wireless connection) and is structured and operable to sense whether the parking brake actuator 58 is in the unlocked/disengaged position or the locked/engaged position and communicate the position to the controller 40.

In such embodiments, the controller 40 can be further structured and operable to disable operation of the engine 22 (as described above) and disable operation of the grass cutting unit(s) 26 (as described above) when the controller 40 determines that an operator is not present at the operator control station 18 (as described above) and the parking brake sensor 62 communicates that the parking brake lever 58 is in the unlocked/disengaged position. However, if the parking brake sensor 62 communicates that the parking brake lever 58 is in the locked/engaged position such that at least one of the wheel brakes is fixedly engaged, and the controller 40 determines that an operator is not present at the operator control station 18, the controller 40 of such embodiments will only disable the grass cutting unit(s) 26 (as described above) and maintain operational enablement of the engine 22. Hence, if the operator engages the parking brake actuator 58 to fixedly engage at least one wheel brake (i.e., set the parking brake) and then steps away from, or out of, the operator control station 18, the controller 40 of such embodiments will determine that an operator is no longer present at the operator control station 18 (as described above) and will disable operation of the grass cutting unit(s) 26 (as described above), but allow the engine 22 to continue operate. Therefore, if the operator subsequently positions himself/herself at, or within, the operator control station 18, he/she will not need to restart the engine 22, e.g., via operation of a vehicle starting switch, button or key, but rather only enable the grass cutting unit(s) 26, e.g., via operation of a power take off switch.

It is envisioned that in various instances one or more of the operator presence sensor(s) 34 may become disabled or rendered non-functional. Such disablement/non-functionality could be caused by tampering with the sensor(s) 34 to disable the sensor(s) 34, damage to the sensor(s) 34, failure of the sensor(s) 34 to operate/function properly, or any other scenario where one or more of the sensor(s) 34 become(s) intentionally or unintentionally disabled or is rendered non-functional.

It is further envisioned that in such instances, the controller 40 of some example embodiments can detect that the disabled/non-functional operator presence sensor(s) 34 has/have been disabled/rendered non-functional, and is/are not detecting that an operator is not present at, or within, the operator control station 18, as described above. It is still further envisioned that such disabled/non-functional detection can be determined by the controller 40 based on various scenarios, such as: exceeding a stipulated duration of time that communication with the respective sensor(s) 34 continuously indicate(s) that an operator is not present at, or within, the operator control station 18 (e.g., communication with a sensor 34 continuously indicates that an operator is not present at, or within, the operator control station 18 for 3, 5, 10, etc. minutes); or a number of times operation of the vehicle 14 is initiated and terminated with the respective sensor(s) 34 indicating that an operator is not present at, or within, the operator control station 18 (e.g., the vehicle ignition is activated and deactivated to turn the vehicle 14 On and Off three consecutive times wherein each time communication with the respective sensor(s) 34 indicate(s) that an operator is not present at, or within, the operator control station 18); or a frequency of indication by the respective sensor(s) 34 that no operator is present at, or within, the operator control station 18 (e.g., communication with a sensor 34 repetitively indicates that an operator is not present at, or within, the operator control station 18 at a frequency of three or more times per minute for three or more consecutive minutes); or there is a lack of communication between the respective sensor(s) 34 and the controller 40 for stipulated duration (e.g., three minutes or more); or any other scenario that may result from the disablement/non-functioning of the sensor(s) 34.

In various embodiments, when the controller 40 determines that one or more of the sensor(s) 34 has been disabled or rendered non-functional, the controller 40 of such embodiments will disable operation of the grass cutting unit(s) 26 and/or the engine 22, as described above. For example, in various implementations, if disablement/non-functionality is determined, the controller 40 can disable operation of grass cutting unit(s) 26 and the engine 22, such that the vehicle 14 is inoperable until the respective sensor(s) 34 are rendered operable. In such instances the vehicle 14 may need to be towed to a repair location. Alternatively, in various other implementations, the controller 40 can disable operation of grass cutting unit(s) 26 and limit operation of the engine 22 (e.g., limit the speed and/or torque output of the engine 22), such that the vehicle 14 can be driven to a repair location at a set speed or a reduced maximum speed.

Referring now to FIGS. 1 and 3, in various embodiments, the operator detection system 10 further comprises a system status indicator device 66 disposed on or in the vehicle 14 at a location that is readily viewable by the operator as the operator operates the vehicle 14. For example, in various implementations, the system status indicator device 66 can be disposed in the control panel 38 of the vehicle 14. The system status indicator device 66 can be communicatively connected to the controller 40 and/or each operator presence sensor 34 (via a wired or wireless connection) and is structured and operable to indicate an operational status of each of the operator presence sensor(s) 34. Particularly, the system status indicator device 66 is structured and operable to inform the operator whether each of the operator presence sensors 34 is or is not detecting that an operator is present at, or within, the operator control station 18, and/or whether one or more of the operator presence sensor(s) 34 has been disable or rendered non-functional. Accordingly, the operator can determine whether each operator presence sensor 34 is functioning properly and/or has been disabled.

The system status indicator device 66 can be any device suitable for indicating to the operator the operation status of each of the operator presence sensors 34. For example, in various embodiments, the system status indicator device 66 can comprise a display, such as a light emitting diode (LED) display, having one or more LEDs and/or other indicators that are associated with each of the operator presence sensors 34. In such embodiments, the controller 40 can be structured and operable to monitor the operational status of each operator presence sensor 34 (i.e., whether each sensor 34 is sending and receiving the signals that comprise the respective sensing field 42) and illuminate the corresponding LED if the respective operator presence sensor is operating properly. Conversely, if the controller 40 determines that any of the operator presence sensor(s) 34 is not operating properly and/or has been disabled, the controller 40 will not illuminate the corresponding LED, flash the corresponding LED and/or change the color of the corresponding LED (or illuminate a corresponding LED of a different color) to inform the operator that a particular sensor 34 is not operating properly and/or has been disabled.

The description herein is merely exemplary in nature and, thus, variations that do not depart from the gist of that which is described are intended to be within the scope of the teachings. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the disclosure. Such variations and alternative combinations of elements and/or functions are not to be regarded as a departure from the spirit and scope of the teachings.

What is claimed is:

1. An operator detection system for sensing the presence of an operator at an operator control station of a turf-care vehicle, said system comprising:
   at least one operator presence sensor disposed in an operator control panel of a turf-care vehicle that is located in front of an operator control station of the vehicle, the at least one operator presence sensor structured and operable to emit a sensing field that projects into the operator control station to sense whether an operator is present at the operator control station; and
   a controller communicatively connected to the at least one operator presence sensor and structured and operable to:
      communicate with the at least one operator presence sensor and determine whether each of the at least one operator presence sensor senses that an operator is present at the operator control station,
      enable operation of an engine of the vehicle and at least one cutting unit of the vehicle when at least one of the at least one operator presence sensor senses that the operator is present at the operator control station, and
      disable operation of at least one of the engine and the at least one cutting unit when at least one of the at least one operator presence sensor senses that the operator is not present at the operator control station.

2. The system of claim 1, wherein the controller is further communicatively connected to a parking brake sensor of the vehicle, the parking brake sensor structured and operable to communicate whether a parking brake actuator of the vehicle is in one of engaged and disengaged position, the controller further structured and operable to disable operation of the engine and the at least one cutting unit when at least one of the at least one operator presence sensor senses that the operator is not present at the operator control station and the parking brake sensor communicates that the parking brake actuator is in the disengaged position.

3. The system of claim 2, wherein the controller is further structured and operable to disable operation of the at least one cutting unit and maintain operational enablement of the engine when at least one of the at least one operator presence sensor senses that the operator is not present at the operator control station and the parking brake sensor communicates that the parking brake actuator is in the engaged position.

4. The system of claim 1, wherein the system comprises a plurality of operator presence sensors disposed adjacent the operator control station, and the controller is communicatively connected to each of the operator presence sensors and is structured and operable to:
 communicate with each operator presence sensor and determine whether each operator presence sensor senses that an operator is present at the operator control station,
 enable operation of an engine of the vehicle and at least one cutting unit of the vehicle when at least two of the operator presence sensors sense that the operator is present at the operator control station, and
 disable operation of at least one of the engine and the at least one cutting unit when at least two of the operator presence sensors sense that the operator is not present at the operator control station.

5. The system of claim 1 further comprising a system status indicator device disposed on the vehicle at a location that is readily viewable by the operator and structured and operable to indicate an operational status of each of the at least one operator presence sensor.

6. The system of claim 1, wherein the at least one operator presence sensor comprises at least one ultrasonic sensor.

7. A method for sensing the presence of an operator at an operator control station of a turf-care vehicle and controlling operation of the vehicle based on the sensed operator presence, said method comprising:
 emitting and projecting a sensing field into an operator control station of a turf-car vehicle, via at least one operator presence sensor disposed in an operator control panel of the vehicle located in front of the operator control station;
 sensing whether an operator is present at an operator control station of the vehicle utilizing the sensing field of at least one operator presence sensor;
 monitoring the at least one operator presence sensor, via a controller communicatively connected to the at least one operator presence sensor, to determine whether each of the at least one operator presence sensor senses that an operator is present at the operator control station;
 enabling, via the controller, operation of an engine of the vehicle and at least one cutting unit of the vehicle when at least one of the at least one operator presence sensor senses that the operator is present at the operator control station; and
 disabling, via the controller, operation of at least one of the engine and the at least one cutting unit when at least one of the at least one operator presence sensor senses that the operator is not present at the operator control station.

8. The method of claim 7 further comprising:
 monitoring a parking brake sensor of the vehicle, via the controller, to determine whether a parking brake actuator of the vehicle is in one of an engaged and disengaged position; and
 disabling, via the controller, operation of the engine and the at least one cutting unit when at least one of the at least one operator presence sensor senses that the operator is not present at the operator control station and the parking brake sensor communicates that the parking brake actuator is in the disengaged position.

9. The method of claim 8 further comprising disabling operation of the at least one cutting unit and maintaining operational enablement of the engine when at least one of the at least one operator presence sensor senses that the operator is not present at the operator control station and the parking brake sensor communicates that the parking brake actuator is in the engaged position.

10. The method of claim 7, wherein the at least one operator presence sensor comprises a plurality of operator presence sensors and wherein:
 enabling, via the controller, operation of an engine of the vehicle and at least one cutting unit of the vehicle comprises enabling, via the controller, operation of an engine of the vehicle and at least one cutting unit of the vehicle when at least two of the operator presence sensors sense that the operator is present at the operator control station, and wherein
 disabling, via the controller, operation of at least one of the engine and the at least one cutting unit comprises disabling, via the controller, operation of at least one of the engine and the at least one cutting unit when at least two of the operator presence sensors sense that the operator is not present at the operator control station.

11. The method of claim 7 further comprising indicating, via a system status indicator device, disposed on the vehicle at a location that is readily viewable by the operator, an operational status of each of the at least one operator presence sensor.

12. The method of claim 7, wherein the at least one operator presence sensor comprise at least on ultrasonic sensor, and wherein sensing whether an operator is present at an operator control station comprises utilizing ultrasound waves transmitted and received by the at least one operator presence sensor to determine whether an operator is present at an operator control station.

13. An operator detection system for sensing the presence of an operator at an operator control station of a turf-care vehicle, said system comprising:
 a plurality of operator presence sensors disposed adjacent an operator control station of the vehicle, the plurality of operator presence sensors structured and operable to sense whether an operator is present at the operator control station; and
 a controller communicatively connected to each operator presence sensor and structured and operable to:
  communicate with each operator presence sensor and determine whether each operator presence sensor senses that an operator is present at the operator control station,
  enable operation of an engine of the vehicle and at least one cutting unit of the vehicle when at least two of the operator presence sensors sense that the operator is present at the operator control station, and
  disable operation of at least one of the engine and the at least one cutting unit when at least two of the operator presence sensors sense that the operator is not present at the operator control station.

14. The system of claim 13, wherein the controller is further communicatively connected to a parking brake sensor of the vehicle, the parking brake sensor structured and operable to communicate whether a parking brake actuator of the vehicle is in one of engaged and disengaged position, the controller further structured and operable to disable operation of the engine and the at least one cutting unit when at least two of the operator presence sensors senses that the operator is not present at the operator control station and the parking brake sensor communicates that the parking brake actuator is in the disengaged position.

15. The system of claim 14, wherein the controller is further structured and operable to disable operation of the at least one cutting unit and maintain operational enablement of the engine when at least two of the operator presence sensor senses that the operator is not present at the operator control station and the parking brake sensor communicates that the parking brake actuator is in the engaged position.

16. The system of claim 13 further comprising a system status indicator device disposed on the vehicle at a location that is readily viewable by the operator and structured and operable to indicate an operational status of each of the plurality of operator presence sensors.

17. An operator detection system for sensing the presence of an operator at an operator control station of a turf-care vehicle, said system comprising:
    at least one operator presence sensor disposed adjacent an operator control station of the vehicle, the at least one operator presence sensor structured and operable to sense whether an operator is present at the operator control station;
    a parking brake sensor structured and operable to sense whether a parking brake actuator of the vehicle is in one of engaged and a disengaged position; and
    a controller communicatively connected to the at least one operator presence sensor and the parking brake sensor of the vehicle and structured and operable to:
        communicate with the at least one operator presence sensor and determine whether each of the at least one operator presence sensor senses that an operator is present at the operator control station,
        communicate with the parking brake sensor and determine whether the parking brake actuator is in the engaged position,
        enable operation of an engine of the vehicle and at least one cutting unit of the vehicle when at least one of the at least one operator presence sensor senses that the operator is present at the operator control station, and
        disable operation of the at least one cutting unit and maintain operational enablement of the engine when at least one of the at least one operator presence sensor senses that the operator is not present at the operator control station and the parking brake sensor communicates that the parking brake actuator is in the engaged position.

18. The system of claim 17, wherein the system comprises a plurality of operator presence sensors disposed adjacent the operator control station, and the controller is communicatively connected to each of the operator presence sensors and is structured and operable to:
    communicate with each operator presence sensor and determine whether each operator presence sensor senses that an operator is present at the operator control station,
    enable operation of an engine of the vehicle and at least one cutting unit of the vehicle when at least two of the operator presence sensors sense that the operator is present at the operator control station, and
    disable operation of at least one of the engine and the at least one cutting unit when at least two of the operator presence sensors sense that the operator is not present at the operator control station.

19. The system of claim 17 further comprising a system status indicator device disposed on the vehicle at a location that is readily viewable by the operator and structured and operable to indicate an operational status of each of the at least one operator presence sensor.

* * * * *